United States Patent [19]
Cox

[11] Patent Number: 5,483,610
[45] Date of Patent: Jan. 9, 1996

[54] CLIP-ON DEVICE FOR OPTICAL POWER METER

[75] Inventor: Larry R. Cox, Austin, Tex.

[73] Assignee: Minnesota Mining and Manufacturing Company, St. Paul, Minn.

[21] Appl. No.: 358,197

[22] Filed: Dec. 16, 1994

[51] Int. Cl.⁶ .............................. G02B 6/00; G02B 6/36
[52] U.S. Cl. .............................................. 385/48; 385/147
[58] Field of Search ................................ 385/48, 31, 32, 385/134, 137, 147

[56] References Cited

U.S. PATENT DOCUMENTS

| | | | |
|---|---|---|---|
| 4,586,783 | 5/1986 | Campbell et al. | 350/96.15 |
| 4,728,169 | 3/1988 | Campbell et al. | 350/96.15 |
| 4,747,652 | 5/1988 | Campbell et al. | 350/96.15 |
| 4,759,605 | 7/1988 | Shen et al. | 350/96.15 |
| 4,790,617 | 12/1988 | Campbell et al. | 350/96.15 |
| 4,824,199 | 4/1989 | Uken | 385/48 X |
| 4,834,482 | 5/1989 | Campbell et al. | 350/96.15 |
| 4,961,620 | 10/1990 | Uken et al. | 350/96.15 |
| 4,981,334 | 1/1991 | Sniadower | 350/96.15 |
| 5,138,690 | 8/1992 | Cox | 350/137 |
| 5,220,703 | 6/1993 | Kanayama et al. | 385/147 X |
| 5,235,657 | 8/1993 | Tardy | 385/48 |
| 5,259,051 | 11/1993 | Burack et al. | 385/147 X |
| 5,311,614 | 5/1994 | Caron et al. | 385/48 X |
| 5,315,365 | 5/1994 | Hakimi et al. | 356/73.1 |
| 5,315,675 | 5/1994 | Dennis et al. | 385/48 X |
| 5,402,511 | 3/1995 | Malone et al. | 385/48 X |
| 5,408,549 | 4/1995 | Tamura et al. | 385/48 X |
| 5,409,074 | 4/1995 | Wilson et al. | 385/147 X |

FOREIGN PATENT DOCUMENTS

| | | | |
|---|---|---|---|
| 326250 | 2/1989 | European Pat. Off. | G02B 6/36 |
| 325382 | 7/1989 | European Pat. Off. | |
| 60-79244 | 7/1985 | Japan . | |
| WO88/07689 | 10/1988 | WIPO | G02B 6/28 |

OTHER PUBLICATIONS

Brochure entitled "Kinematic and Flexural Supports and Pivots For Fine Mechanisms", Instrument Society of America, Pittsburgh Pa., copyright 1969, presented at the Oct. 26–29, 1969 ISA Annual Conference and Exhibit, Houston.

*Primary Examiner*—Akm E. Ullah
*Attorney, Agent, or Firm*—Gary L. Griswold; Walter N. Kirn; Jack V. Musgrove

[57] ABSTRACT

A device for tapping an optical fiber is adapted to engage a fiber supporting structure, such as a tray, having an aperture therein and a fiber passing over the aperture, the fiber tray and the clip-on device having a 3-point, nested contact which essentially restricts all relative movement between the tray and the device in the contact plane, providing improved repeatability in the positioning of the optical fiber in the head of the device, and thus improving repeatability of the optical measurements. A similar 3-point, nested contact may be used to align a mandrel housing with a fiber guide in the head, prior to a mandrel engaging the optical fiber. The mandrel housing is slidably received in a cylinder, and may have an elliptical outer surface which fits in an elliptical inner surface of the cylinder, to prevent rotation of the mandrel housing within the cylinder. Means may also be provided to lock the device onto the tray, prior to engagement of the mandrel and fiber, to minimize operator influence on the measurement process.

19 Claims, 4 Drawing Sheets

CLIP-ON DEVICE FOR OPTICAL POWER METER

BACKGROUND OF THE INVENTION

1. Field of the Invention

The present invention generally relates to devices for testing signals in cables, such as telecommunications signals, and more particularly to a device for testing the operation of an optical fiber which may be carrying an active signal.

2. Description of the Prior Art

In fiber optic networks, such as are used for telecommunications or cable television, it often becomes necessary to access the fibers and examine any signal therein, for example, to ensure that there are not significant faults (optical losses) in the network, or to identify and redirect "miswired" fibers. Several instruments have been devised which extract any light signal from a fiber, or inject light therein (collectively, "tapping" the fiber), without cutting into or otherwise damaging the fiber (i.e., non-intrusive measurement), by introducing a microbend in the fiber and positioning a photoelectric eye near the bend, to sense any leakage of light through the cladding and buffer of the fiber. Industry standards demand an optical loss at the bend of no more than 3 dB. These instruments are commonly referred to as "pick-off" or "clip-on" devices, and are used with fiber identifiers, power meters, active devices, etc., as shown in the following patents:

U.S. Pat. No. 4,586,783
U.S. Pat. No. 4,728,169
U.S. Pat. No. 4,747,652
U.S. Pat. No. 4,759,605
U.S. Pat. No. 4,790,617
U.S. Pat. No. 4,824,199
U.S. Pat. No. 4,834,482
U.S. Pat. No. 4,981,334
U.S. Pat. No. 5,138,690
U.S. Pat. No. 5,315,365
U.S. Pat. No. 5,315,675
Patent Cooperation Treaty Application No. GB88/00225
Patent Cooperation Treaty Application No. GB92/01152
European Patent Application No. 325,382
Japanese Patent Application (Kokai) No. 60-79244

Several of the devices shown in these patents disclose means for aligning the optical fiber with a mandrel or sensor head having a groove or other surface structures which position the fiber adjacent the photodiode and induce the bend. While such means improve the repeatability of measurements taken with the clip-on device, industry standards have become more exacting and the existing clip-on mechanisms do not have the repeatability currently demanded by telecommunications and cable operators. This limitation is due in part to the prohibitive cost of mass manufacturing clip-on components having extremely tight tolerances (on the order of 6 microns), and also due to the lack of a precise method of positioning or holding the clip-on device in a stable manner, prior to placement of the fiber in the sensor head, as well as during the measurement process. Indeed, while the foregoing references disclose means for aligning the mandrel with the sensor head, there is no disclosure of any support structure for the optical fiber, separate from the clip-on device, or any means for precisely aligning the clip-on housing with any such support structure. In other words, when the clip-on device is completely disengaged from the fiber and then reapplied, there is no assurance that the same portion of the fiber will be tested, or that the fiber will have the same torsional and compressive loads, etc.

One clip-on device 10 that improves on these designs, and is probably the closest prior art to the present invention, is adapted to fasten onto a fiber support tray 12 as shown in FIG. 1. Tray 12 has an aperture 14 therein over which passes a fiber 16. A wall 18 surrounds aperture 14, and notches 20 are formed in wall 18 to allow the straight passage of the fiber across aperture 14. Clip-on device 10 has a head portion 22 in which resides an optical sensor, i.e., photodiode. Head 22 includes a fitting or shroud 24 which serves to block out ambient light from above the tray. As the handles of the device are squeezed and shroud 24 forcibly contacts tray 12, a mandrel in the lower housing of the device pushes fiber 16 into a fiber guide 26 in head 22 and the measurement is taken by engaging a switch 27 (a slight delay may be provided in the measurement to ensure that the reading is more accurate and repeatable). Fiber guide 26 also provides nominal alignment with wall 18, i.e., the inner surface of wall 18 has a rectangular cross-section and is sized to fit the rectangular outer shape of fiber guide 26. Fiber guide 26 may be provided with a rectangular cutout to further align the mandrel with the waveguide.

The prior art clip-on device 10 is shown in detail in the exploded perspective of FIG. 2, and generally includes a handle 28 supporting both head 22 and a mandrel assembly 30, and a lever 32 for actuating the device by forcibly urging mandrel assembly 30 toward head 22. Head 22 has a cavity therein which receives a waveguide element 34 constructed of an optically transmissive material (such as acrylic) and having one or more optical sensors (not shown) integrated therein for detecting leakage of any light from a fiber placed against the element. The outer walls of the element may be painted (e.g., black), to further reduce the effect of ambient light and also reduce internal reflections within the waveguide. Output wires (not shown) from the sensors lead to a connector or adapter 36 formed on handle 28, which receives a retractable cord 38. Adapter 36 preferably includes some strain relief structures. Cord 38 leads to the power meter (not shown) which interprets the detector information and converts it to, e.g., a decibel reading displayed on a liquid crystal display. Head 22 is attached to the upper arm 40 of handle 28.

Mandrel assembly 30 includes a cylindrical member 42 which houses a shaft 44 on which is mounted a mandrel 46. Cylinder 42 is fixedly attached to the lower arm 48 of handle 28 by means of a retaining ring 50 which abuts an annular flange 52 on cylinder 42. Shaft 44 is allowed to slide within cylinder 42, by means of a bearing 54. A tubular housing or button 56 slides on the outside of cylinder 42, i.e., button 56 has an inner diameter which is approximately equal to the outer diameter of cylinder 42. Lever 32, which is pivotally attached at one end to handle 28, is coupled to button 56 by actuator pins 58 which engage grooves 60 formed on opposing sides of button 56. In this manner, when lever 32 is squeezed toward handle 28, actuator pins 58 push button 56 upward, but the movement of the button (and shaft 44) is linear rather than arcuate due to the ability of pins 58 to slide in grooves 60. Button 56 (which may also be directly actuated by pushing on the button rather than by squeezing lever 32) forcibly urges shaft 44 upward. Return spring 62, which fits in an interior annular groove of cylinder 42, maintains cylinder 42 in a retracted position when device 12 is in its unactuated state. Spring 66 urges the mandrel housing upward. The force applied by lever 32 to mandrel 46 is further transmitted through another spring 68, abutting a second washer or flange 70 on shaft 44, i.e., mandrel 46 may slide within the upper portion of shaft 44. Compression of spring 68 determines the total force which can be applied by mandrel 46 to the fiber, and more particularly prescribes a set pressure level on the fiber, independent of operator induced loading beyond the initial load requirements. Flanges 64 and 70 provide solid contact between button 56, shaft 44 and the mandrel housing. Stop pins 72 also provide means for absolutely limiting the movement of mandrel 46 in the retracted position, while cross-pin 73 restrains rotational movement. Shaft 44 can move back about 2 mm from this extreme position before the force of the fiber is affected. Mandrel 46 is further aligned with fiber guide 26 by mandrel housing 74 which fits in the upper portion of cylinder 42. Guide wires 76 are used, in conjunction with longitudinal grooves 78 formed in the outer surface of mandrel housing 74, to properly seat mandrel housing 74 in cylinder 44. The use of the springs allows mandrel housing 74 to move into position first with mandrel 46 progressing toward the fiber after mandrel housing 74 has come to rest.

A latching mechanism is provided to secure device 10 in a stowed position when it is not being used. This mechanism includes a latching cylinder 80 having inner flanges 82 which are adapted to contact lugs 84 on the outer surface of mandrel housing 74. Prior to storage of the device, lever 32 is squeezed, without there being any fiber tray or other obstruction between head 22 and latching cylinder 80, raising mandrel housing 74 to engagement with fiber guide 26. This places mandrel housing 74 substantially above latching cylinder 80, such that twisting of cylinder 80 positions flanges 82 under lugs 84. Lever 32 may then be released, but mandrel housing 74 will remain locked against head 22, protecting waveguide element 34 as well as mandrel 46 from accidental damage or foreign contaminants. The latch will not permit closure of the device while the mandrel is in contact with the fiber, or allow closing of the device when it is attached to tray 12.

The use of fiber guide 26 to position head 22 prior to engagement of the fiber provides some improvement in the repeatability of measurements taken with clip-on device 10, but there is still a noticeable amount of movement between head 22 and tray 12 when the device is held on the tray, due to the manufacturing tolerances designed into the shapes of wall 18 and fiber guide 26. One prior art reference has attempted to provide alignment of the clip-on device with a fiber support structure, but that device suffers from the same limitations regarding manufacturing tolerances. Specifically, European Patent Application No. 326,250 discloses the use of four (straight) latching posts formed on the fiber support structure which mate with holes formed in the bottom of the clip-on device. Although these posts again provide nominal alignment of the device with the fiber support structure, it is difficult/costly to fabricate the posts and the clip-on device with the tolerances necessary to achieve essentially total restriction of movement of the clip-on device in any direction other than the axes of the posts.

There is also a relatively significant amount of play between mandrel 46 and fiber guide 26 of device 10. While these components could be fabricated with extremely tight tolerances and provide even further improvement in repeatability, the manufacturing techniques required for mass-producing clip-on devices would make them commercially unfeasible due to cost. It would, therefore, be desirable to devise a clip-on device which has greater accuracy and repeatability imparted by improved alignment of the mandrel with the fiber guide, as well as by improved alignment of the head of the clip-on device with the fiber support structure. It would further be advantageous if the clip-on device did not have to rely on manually securing the device to the fiber support structure during the measurement process since such manual assistance can affect the repeatability of the measurements.

SUMMARY OF THE INVENTION

The present invention provides a system for tapping an optical fiber, generally comprising a fiber support structure, such as a tray, having an aperture passing therethrough, and having means for receiving an optical fiber with a portion of the fiber passing over the aperture, and a clip-on device having an optical head, a waveguide located in the optical head, and a mandrel adapted to position the optical fiber against the waveguide, there further being provided alignment means formed on the optical head and on the fiber aperture tray, proximate the aperture, effectively defining three nonlinear points of contact which further define a contact plane, the alignment means restricting all freedom of movement in the contact plane when the alignment means is engaged by forcibly abutting the optical head against the fiber tray. Means are also provided for preventing the mandrel from moving toward the waveguide unless the alignment means is engaged. In the preferred embodiment, the 3-point contact is provided by three protrusions which are attached to, and preferably integrally molded with, the fiber tray, proximate the aperture, and three holes formed in the head, adapted to receive the three protrusions, respectively. The protrusions comprise tapered cones each having a maximum diameter which is greater than the maximum diameter of said holes, such that the protrusions becomes nested in the holes in a highly repeatable manner. An alternative alignment means comprises a rounded protrusion or ball attached to the tray, which mates with a nest formed in the head, and a cylindrical member attached to tray, oriented generally orthogonal to the ball which mates with a groove formed in the head.

Similar alignment means may be used to provide initial alignment of the mandrel housing with the optical head, or more specifically, with a fiber guide located in the optical head.

The mandrel housing is slidably received in a cylindrical member, forming a mandrel assembly. The housing may be provided with an outer surface whose cross-section is generally oval, and the cylindrical member provided with an inner surface whose cross-section is approximately the same shape and size as the oval mandrel housing cross-section, to prevent rotation of the mandrel housing within the cylindrical member.

Additional means may be provided for locking the head onto the fiber aperture tray in an actuated position without manual assistance, i.e., without the necessity of a user continually squeezing the handle of the clip-on device. For example, a latching mechanism may be formed by a bail provided on the actuation lever of the device which catches a shoulder screw mounted to the device.

BRIEF DESCRIPTION OF THE DRAWINGS

The invention will best be understood by reference to the accompanying drawings, wherein.

DESCRIPTION OF THE PREFERRED EMBODIMENT

Figure 1:
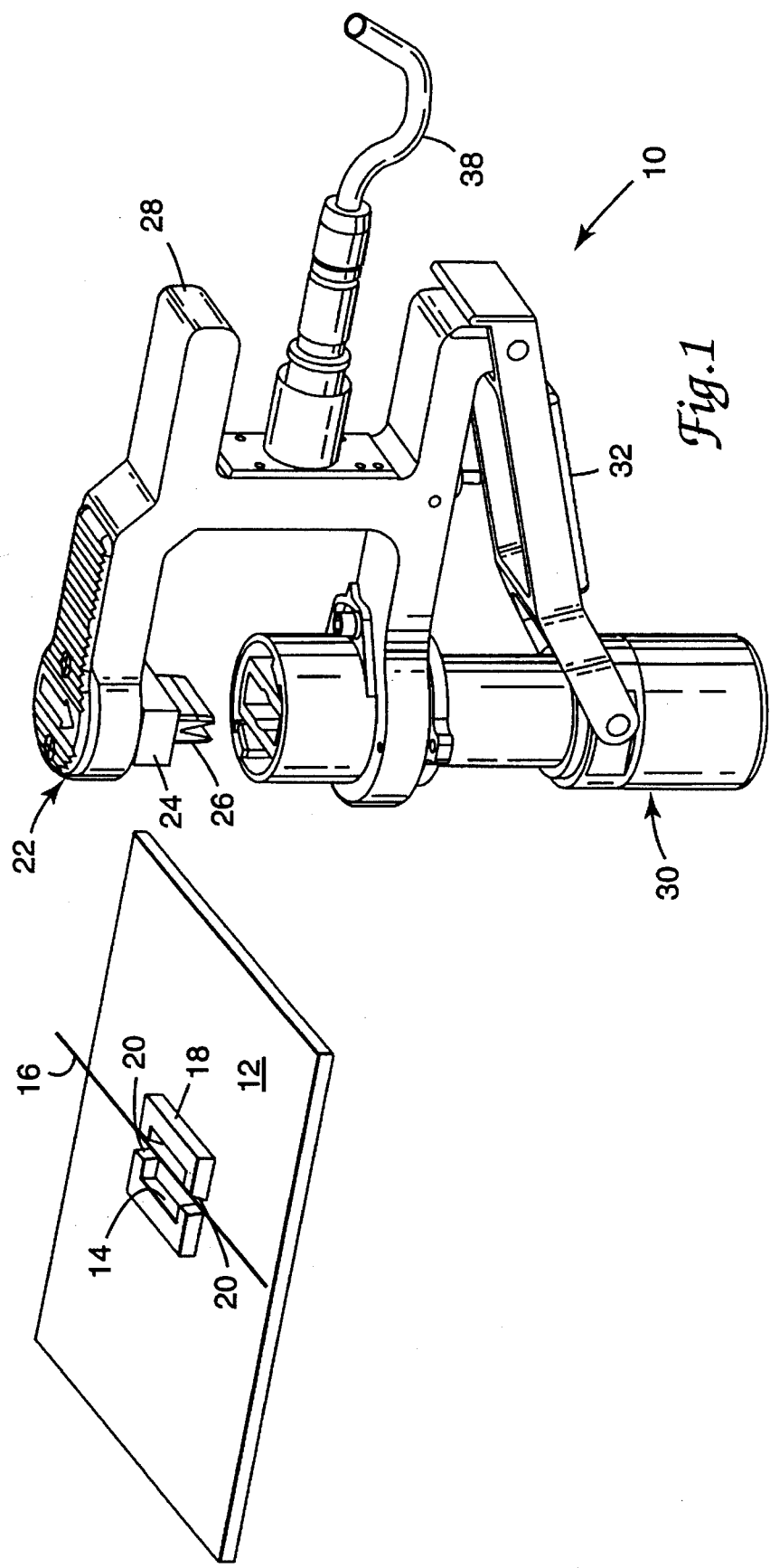
FIG. 1 is a perspective view of a prior art clip-on device and an associated fiber aperture tray.
Figure 2:
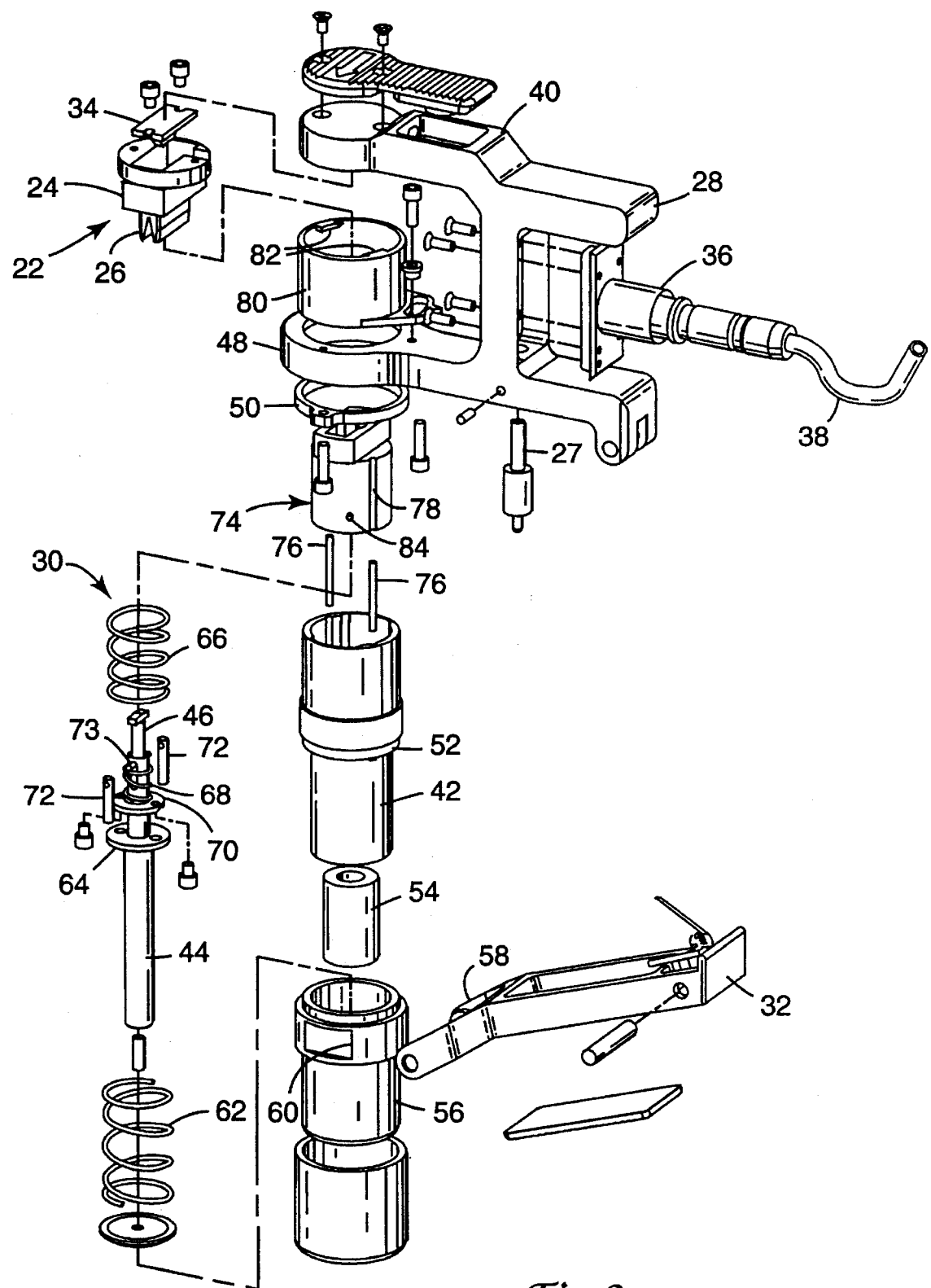
FIG. 2 is an exploded perspective view of the prior art clip-on device of FIG. 1.
Figure 3:
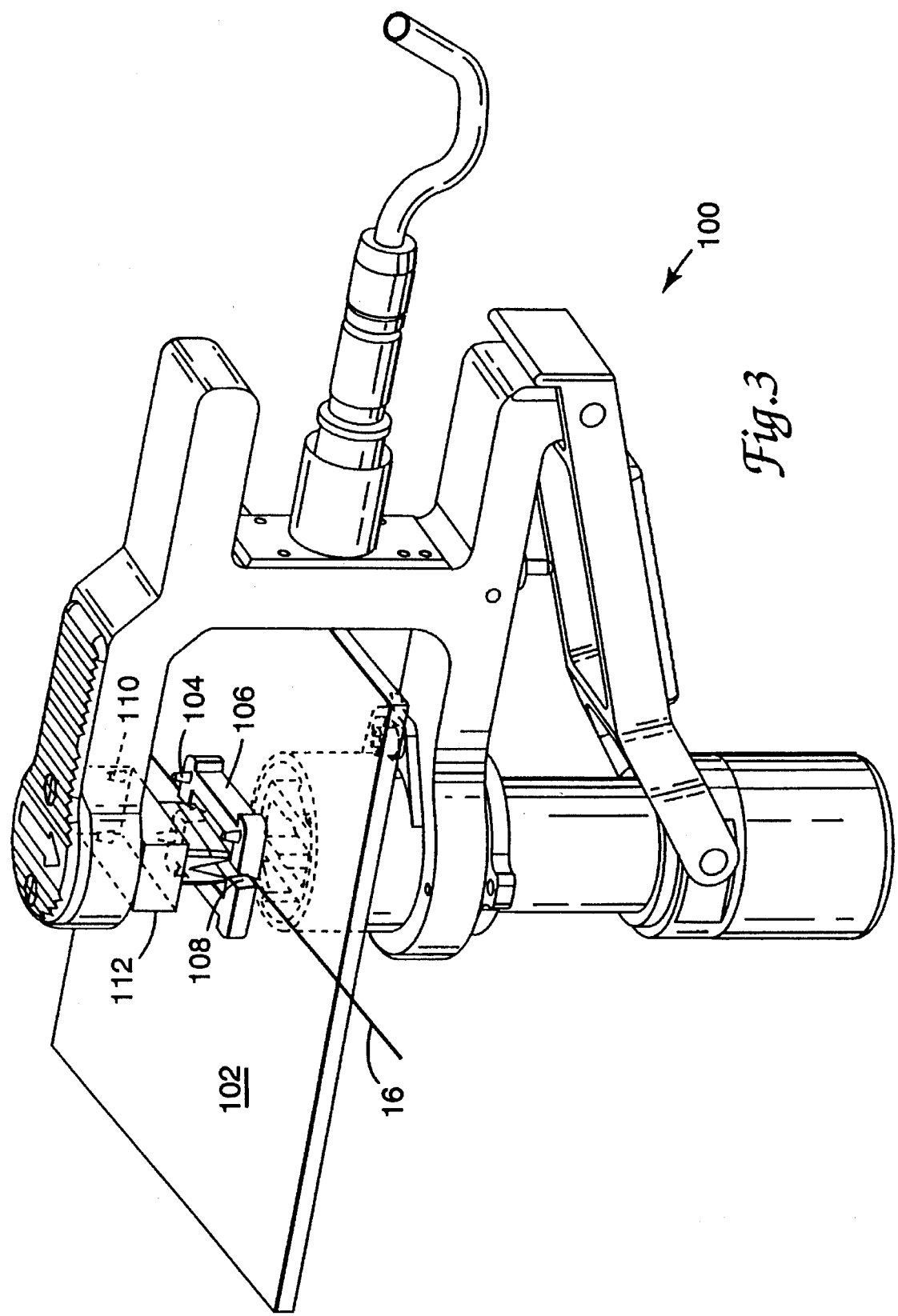
FIG. 3 is a perspective view of the fiber aperture tray and clip-on device according to one embodiment of the present invention.

With reference now to FIG. 3, there is depicted one embodiment of the clip-on device 100 and fiber aperture tray 102 of the present invention. Clip-on device 100 is generally identical to the prior art device of FIGS. 1 and 2 except for the following changes/additions. The primary improvement relates to the precise positioning of clip-on device 100 onto aperture tray 102 and, in this embodiment, comprises three protrusions or locating cones 104 which are attached to, and preferably integrally molded with, aperture tray 102, and more specifically to the wall 106 formed on tray 102, surrounding the aperture 108, and further comprising three holes 110 formed in the shroud 112 of device 100, adapted to receive cones 104.

While this construction is reminiscent of the locating posts of the European '250 patent, there is a critical difference, namely that the present invention provides a 3-point, nested contact between the two structures, and the '250 patent lacks this property. More specifically, a 3-point, nested contact refers to the positioning of two structures such that there are effectively three, and only three, point-like areas of contact between the two structures, defined by three protrusions which nest in three corresponding depressions or indentations. An example of a particular type of 3-point, nested contact is a Boys' carriage of kinematic (or geometric) design theory. Since there is only one position in which the three protrusions can fit in the nests when the two structures are brought together in forcible abutment, the 3-point, nested contact is not only self-aligning but also provides very repeatable alignment which, in the context of clip-on device 100, greatly improves the repeatability of optical measurements. In the device of the European '250 patent, it is highly unlikely that the locating posts will seat themselves in the same position when the device is removed from the fiber supporting structure and repositioned onto the posts. Indeed, the wider tolerances used in these posts is actually due in part to the requirement of using more than three posts, and also due to having posts which are essentially straight rather than tapered.

In such a design, the surface features providing the 3-point contact need not be made to exacting specifications, nor do the exact location of the points of contact need to be controlled. All that is required is that the 3-points be nonlinear, and that the protrusions be nested such that movement in the two degrees of freedom of the contact plane is restricted. Several different types of nest structures may provide this function. One is the cones and holes of the embodiment of FIG. 3, wherein the solid angle subtended by cones 104 must be larger than the solid angle defined by holes 110, and the maximum diameter of cones 104 must be greater than the maximum diameter of holes 110. Of course, the cones could be formed on shroud 112 and the holes formed in wall 106. An alternative design could use small balls or protrusions having arcuate surfaces which nest in tetrahedral cavities. Cylinders can also be used in grooves.

For example, a single ball nested in a cavity coupled with a cylinder lying in a groove which is not collinear with the cavity, would also constitute a 3-point, nested contact (this construction is discussed further below in conjunction with FIG. 4, although there it is used to align the mandrel and waveguide, instead of the clip-on head and tray). While a cylinder may be thought of as having an infinite number of points of contact along its length, according to kinematic theory there are effectively only two such points as a result of tolerances; if there were more than two points of actual contact, this would be a result of unnecessarily tight tolerances, and consequently wasted manufacturing cost since the multiple contact points would still be collinear and so not provide any further alignment or restriction of movement. Thus, the cylinder and ball arrangement effectively has only three points of contact.

In light of the relatively looser manufacturing tolerances allowed by the use of a 3-point, nested contact, and further in light of the multiplicity of surface structures which may be used to provide this type of contact, manufacturing of the alignment features is simplified in the present invention and tooling cost is minimized.

Figure 4:
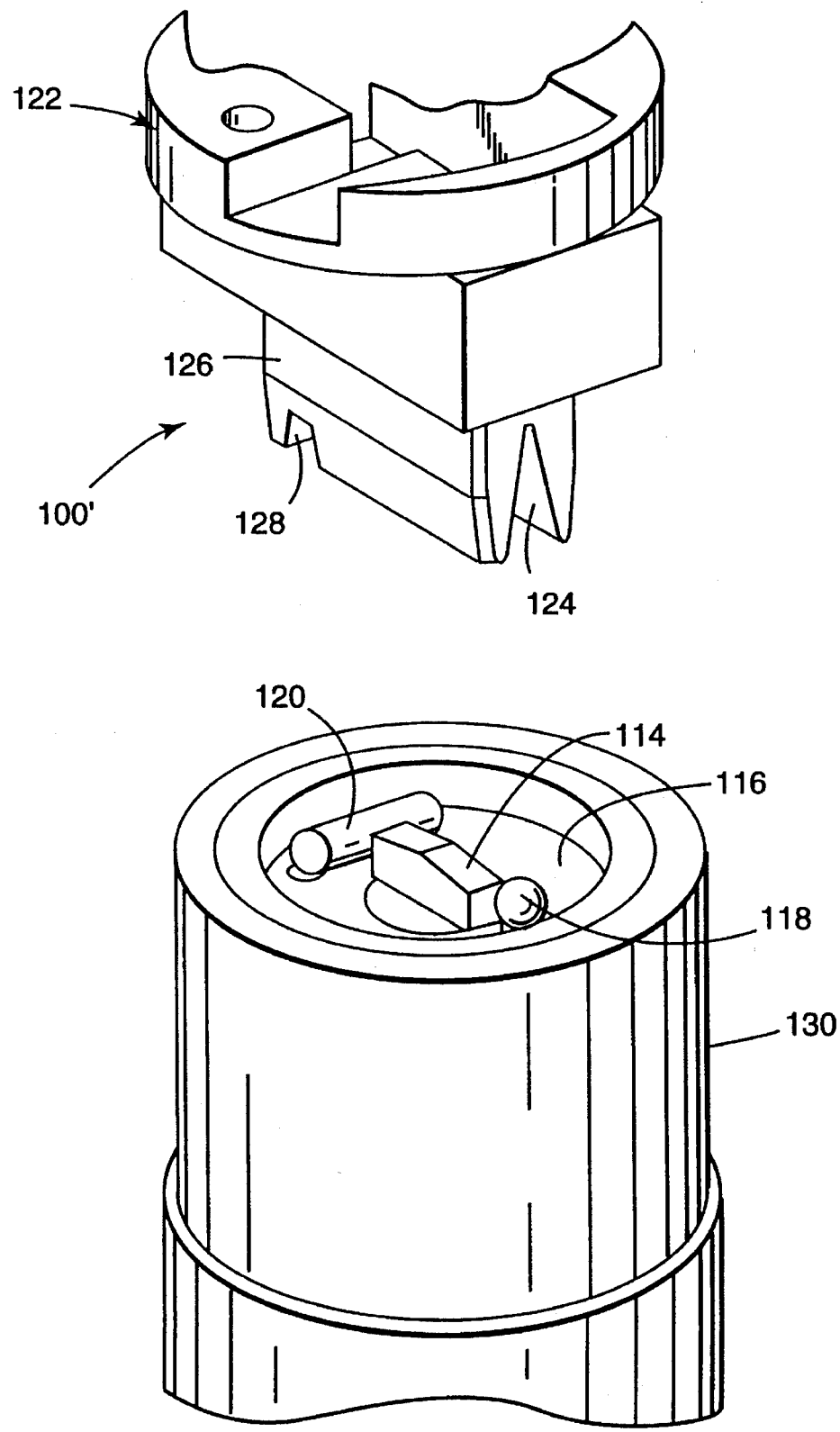
FIG. 4 is a perspective view of a mandrel housing and fiber guide which may be used in the clip-on device of the present invention.

Referring now to FIG. 4, the 3-point, nested contact may also be applied to the alignment of the mandrel 114 with the optical waveguide which houses the photodiode or active device. In this embodiment, the mandrel housing 116 on clip-on device 100' has on its upper surface a ball 118 or other protrusion having an arcuate shape, and a cylinder 120 oriented orthogonal to ball 118. When device 100' is actuated and mandrel housing 116 is urged toward head 122, ball 118 becomes nested in V-groove 124 of fiber guide 126, and cylinder 120 becomes nested in a cross-groove 128 formed in fiber guide 126. Ball 118 should be sufficiently large so that it does not crimp the fiber, positioned at the apex of V-groove 124. This construction provides for a high degree of positional repeatability of mandrel 114 with the optical waveguide prior to mandrel 114 touching the fiber, again without requiring excessively tight tolerances in the fabrication of the grooves or the ball and cylinder.

Another cost-saving improvement is shown in FIG. 4. The cylinder 130 which slidably receives mandrel housing 116 has an inner surface whose cross-section is generally oval or elliptical. Mandrel housing 116 accordingly has an outer surface with an oval shape of approximately the same size. This construction prevents the rotation of mandrel housing 116, but eliminates the guide wires used in the prior art device.

Additional repeatability in optical measurements may be achieved by minimizing operator influence, specifically, by providing means for locking device 100' in its actuated position, but without manual assistance, i.e., continual squeezing of the handle. Such locking means may take the form of a bail attached to the actuation lever which catches on a shoulder screw attached to the handle, or a twisting knob on the handle which engages the cylindrical member of the mandrel assembly. The clip-on device of the present invention could incorporate additional features, such as dampening of the mandrel movement or sensors for the mandrel, as taught in U.S. Pat. No. 5,138,690.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, while the clip-on device of the present invention is particularly useful in conjunction with power meters, those skilled in the art will appreciate that its use is not so limited, as it could be used with other devices such as fiber identifiers (checking for a test signal), or to inject light into the fiber with an active device. It is therefore contemplated that such modifications can be made without departing from the spirit or scope of the present invention as defined in the appended claims.

I claim:

1. A system for tapping an optical fiber, comprising:
    a fiber support structure having an aperture passing therethrough, and having means for receiving an optical fiber with a portion of the fiber passing over said aperture;
    a clip-on device having
        an optical head,
        a waveguide located in said optical head, and
        a mandrel member coupled to said head, adapted to position the optical fiber against said waveguide;
    alignment means formed on said optical head and on said fiber support structure, proximate said aperture, effectively defining three nonlinear points of contact, said points further defining a contact plane, and said alignment means restricting all freedom of movement in said contact plane when said alignment means is engaged by forcibly abutting said head against said fiber support structure; and
    means, located in said clip-on device, for preventing said mandrel member from moving toward said waveguide unless said alignment means is engaged.

2. The system of claim 1 wherein said alignment means comprises:
    three protrusions attached to said fiber support structure proximate said aperture; and
    three holes formed in said head and adapted to receive said three protrusions, respectively.

3. The system of claim 1 wherein said alignment means comprises:
    a protrusion attached to said fiber support structure proximate said aperture;
    a cylindrical member attached to said fiber support structure, proximate said aperture, and oriented generally orthogonal to said protrusion;
    a nest formed in said head, adapted to receive said protrusion; and
    a groove formed in said head, adapted to receive said cylindrical member.

4. The system of claim 1 wherein:
    said mandrel member is located in a mandrel housing having an outer surface whose cross-section is generally oval; and
    said mandrel housing is further slidably received in a cylindrical member having an inner surface whose cross-section is approximately the same shape and size as said oval mandrel housing cross-section.

5. The system of claim 2 wherein said protrusions comprise tapered cones each having a maximum diameter which is greater than the maximum diameter of said holes.

6. The system of claim 4 further comprising:
    a fiber guide attached to said optical head, said waveguide being located in said fiber guide;
    second alignment means formed on said fiber guide and on said mandrel housing effectively defining three additional nonlinear points of contact, said points further defining a second contact plane, and second alignment means restricting all freedom of movement in said second contact plane when said second alignment means is engaged by forcibly abutting said fiber guide against said mandrel housing.

7. The system of claim 6 further comprising means for locking said head on said fiber support structure in an actuated position such that said head remains secured to said fiber support structure without manual assistance.

8. A device for tapping an optical fiber, comprising:
    an optical head;
    a fiber guide attached to said optical head;
    a waveguide located in said fiber guide;
    a mandrel member coupled to said head, adapted to position the optical fiber against said waveguide;
    a mandrel housing adapted to receive and align said mandrel member;
    alignment means formed on said fiber guide and on said mandrel housing effectively defining three nonlinear points of contact, said points further defining a contact plane, and said alignment means restricting all freedom of movement in said contact plane when said alignment means is engaged by forcibly abutting said fiber guide against said mandrel housing; and
    means, located in said clip-on device, for preventing said mandrel member from moving toward said waveguide unless said alignment means is engaged.

9. The device of claim 8 wherein said alignment means comprises:
    three protrusions attached to said mandrel housing; and
    three holes formed in said fiber guide and adapted to receive said three protrusions, respectively.

10. The device of claim 8 wherein said alignment means comprises:
    a protrusion attached to said mandrel housing;
    a cylindrical member attached to said mandrel housing, oriented generally orthogonal to said protrusion;
    a nest formed in said fiber guide, adapted to receive said protrusion; and
    a groove formed in said fiber guide, adapted to receive said cylindrical member.

11. The device of claim 8 wherein:
    said mandrel housing has an outer surface whose cross-section is generally oval; and
    said mandrel housing is further slidably received in a cylindrical member having an inner surface whose cross-section is approximately the same shape and size as said oval mandrel housing cross-section.

12. The device of claim 9 wherein said protrusions comprise tapered cones each having a maximum diameter which is greater than the maximum diameter of said holes.

13. A system utilizing the device of claim 11, and further comprising:
    a fiber support structure having an aperture passing therethrough, and having means for receiving an optical fiber with a portion of the fiber passing over said aperture;
    second alignment means formed on said optical head and on said fiber support structure, proximate said aperture, effectively defining three additional nonlinear points of contact, said points further defining a second contact plane, and said second alignment means restricting all freedom of movement in said second contact plane when said second alignment means is engaged by forcibly abutting said head against said fiber support structure; and second means, located in said clip-on device, for preventing said mandrel member from moving toward said waveguide unless said second alignment means is engaged.

14. The system of claim 13 further comprising means for locking said head on said fiber support structure in an actuated position such that said head remains secured to said fiber support structure without manual assistance.

15. A system for tapping an optical fiber, comprising:

a fiber support structure having an aperture passing therethrough, and having means for receiving an optical fiber with a portion of the fiber passing over said aperture;

a clip-on device having
 an optical head,
 a waveguide located in said optical head, and
 a mandrel member coupled to said head, adapted to position the optical fiber against said waveguide;

alignment means formed on said optical head and on said fiber support structure, proximate said aperture, effectively defining three nonlinear points of contact, said points further defining a contact plane, and said alignment means is engaged by forcibly abutting said head against said fiber support structure; and means, located in said clip-on device, for preventing said mandrel member from moving toward said waveguide unless said alignment is engaged; and means for locking said head on said fiber support structure in an actuated position such that said head remains secured to said fiber support structure without manual assistance.

16. The system of claim 15 wherein said locking means comprises:

a bail attached to an actuation lever of the clip-on device; and a shoulder screw attached to a handle of the clip-on device, positioned to removably catch on said bail.

17. The system of claim 15 wherein said protrusions comprise tapered cones each having a maximum diameter which is greater than the maximum diameter of said holes.

18. The system of claim 17 wherein:

said mandrel member is located in a mandrel housing having an outer surface whose cross-section is generally oval; and said mandrel housing is further slidably received in a cylindrical member having an inner surface whose cross-section is approximately the same shape and size as said oval mandrel housing cross-section.

19. The system of claim 18 further comprising:

a fiber guide attached to said optical head, said waveguide being located in said fiber guide;

second alignment means formed on said fiber guide and on said mandrel housing effectively defining three additional nonlinear points of contact, said points further defining a second contact plane, and said second alignment means restricting all freedom of movement in said second contact plane when said second alignment means is engaged by forcibly abutting said fiber guide against said mandrel housing; and second means, located in said clip-on device, for preventing said mandrel member from moving toward said waveguide unless said second alignment means is engaged.

* * * * *